US012210342B2

United States Patent
Bouma et al.

(10) Patent No.: US 12,210,342 B2
(45) Date of Patent: Jan. 28, 2025

(54) METHODS AND APPARATUS FOR SUPPORTING REMOTE CONTROL OPERATION OF DEVICES TAKING INTO CONSIDERATION COMMUNICATIONS LATENCY, ENVIRONMENTAL CONDITIONS, AND/OR A TASK TO BE PERFORMED

(71) Applicant: Third Wave Automation, Inc., Union City, CA (US)

(72) Inventors: Katarina Bouma, Sacramento, CA (US); Connor Schenck, Dublin, CA (US); Julian Mason, Redwood City, CA (US)

(73) Assignee: Third Wave Automation, Inc., Union City, CA (US)

( * ) Notice: Subject to any disclaimer, the term of this patent is extended or adjusted under 35 U.S.C. 154(b) by 191 days.

(21) Appl. No.: 17/725,491

(22) Filed: Apr. 20, 2022

(65) Prior Publication Data

US 2023/0305557 A1   Sep. 28, 2023

Related U.S. Application Data

(60) Provisional application No. 63/324,145, filed on Mar. 27, 2022.

(51) Int. Cl.
*H04L 12/00* (2006.01)
*G05D 1/00* (2006.01)

(52) U.S. Cl.
CPC ......... *G05D 1/0022* (2013.01); *G05D 1/0094* (2013.01); *G05D 1/0223* (2013.01)

(58) Field of Classification Search
CPC .. G05D 1/0022; G05D 1/0094; G05D 1/0223; G05D 1/2247; G05D 1/661;

(Continued)

(56) References Cited

U.S. PATENT DOCUMENTS 9,623,562 B1 * 4/2017 Watts ................... B66F 17/003
2010/0070079 A1 * 3/2010 Mangaser ............. G16H 40/63
700/259

(Continued)

FOREIGN PATENT DOCUMENTS

DE   102019206582 A1   11/2020
EP   2865495 A1   9/2014

OTHER PUBLICATIONS

Notification of Transmittal of the International Search Report and the Written Opinion of the International Searching Authority, International Search Report and Written Opinion of the International Searching Authority from PCT/US2023/016348, dated Jul. 21, 2023, pp. 1-15.

*Primary Examiner* — Shardul D Patel
(74) *Attorney, Agent, or Firm* — Straub & Straub; Michael P. Straub; Stephen T. Straub

(57) ABSTRACT

In various embodiments communications latency and/or bandwidth of a communications connection between a device being controlled a remote operator workstation being used to control the device is measured. One or more parameters of the system, e.g., operator control stations and/or the device, e.g., robotic device, being remotely controlled, e.g., teleoperated, are altered in response to one or more of: i) communications latency, ii) communications bandwidth, iii) a task to be performed; and/or iv) environmental conditions. By changing such parameters, things such as maximum speed of device operation, a maximum acceleration or a maximum rate of movement of a device element such as forks of a forklift the device can be controlled or limited. The changing of parameters takes into consideration one, more or all of: i) communications latency, ii) communications bandwidth, iii) a task to be performed; and/or iv) environmental conditions.

17 Claims, 9 Drawing Sheets

(58) Field of Classification Search
CPC ........... G05D 2105/28; G05D 2107/70; G05D 2109/10; G05D 1/82; G05D 1/226; G05D 1/00; B66F 9/063; H04W 4/35; H04W 4/40; H04L 12/00; B60W 10/00
USPC ........................................................... 701/2
See application file for complete search history.

(56) References Cited

U.S. PATENT DOCUMENTS

| | | | |
|---|---|---|---|
| 2015/0120048 A1* | 4/2015 | Summer ................ | B25J 9/1692 |
| | | | 700/254 |
| 2016/0158942 A1* | 6/2016 | Augenbraun ........ | B25J 11/0085 |
| | | | 901/10 |
| 2017/0182664 A1* | 6/2017 | Watts ......................... | B66F 9/24 |
| 2018/0151003 A1* | 5/2018 | Grobler ............. | G06F 16/90335 |

* cited by examiner

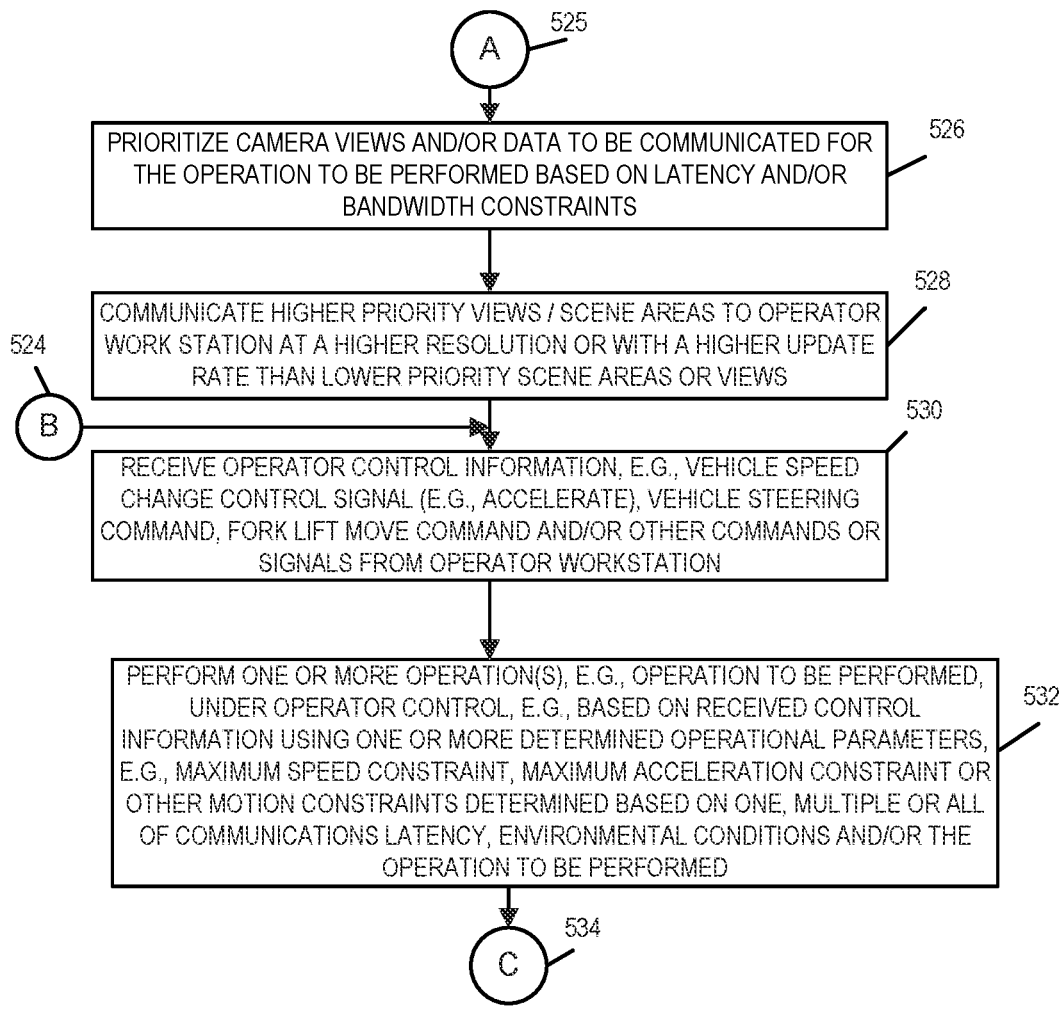
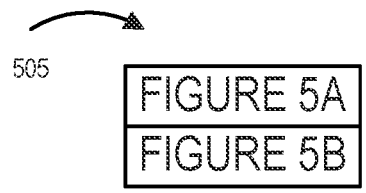
FIGURE 5B
FIGURE 5

METHODS AND APPARATUS FOR SUPPORTING REMOTE CONTROL OPERATION OF DEVICES TAKING INTO CONSIDERATION COMMUNICATIONS LATENCY, ENVIRONMENTAL CONDITIONS, AND/OR A TASK TO BE PERFORMED

RELATED APPLICATIONS

The present application claims the benefit of U.S. Provisional Patent Application Ser. No. 63/324,145 which was filed on Mar. 27, 2022 and which is hereby expressly incorporated by reference in its entirety.

FIELD

The present application relates to remote control methods and apparatus and, more particularly to methods and apparatus for controlling a device, e.g., a forklift or other robotic device, from a remote location taking into consideration latency, environmental conditions and/or a task to be performed.

BACKGROUND

Remote control of devices, which move and perform tasks, can be challenging given limitations in both latency and bandwidth between the device to be controlled and the control station from which the device is to be controlled. This is particularly the case with vehicles such as forklifts, robots and/or other devices which may need to operate in locations where humans may also be located and/or where obstacles may be located. The particular challenges faced in controlling a remote device can be further complicated by the task to be performed and/or environmental conditions or factors such as the location of obstacles in the environment, objects to be moved, and/or other factors such as drop offs, slopes and or the width of a path to be traversed.

In the case of remote control of devices, it is desirable to have skilled operators controlling the device. From an implementation and oversight perspective, it is often desirable to have multiple operators working from a centralized site for training purposes and/or to allow for switching between skilled operators. Once trained operators may work from various locations assuming they have a suitable communications connection to support video and/or control signaling to/from the device to be controlled. In fact, it can even be possible for remote operators to work from home. In the examples of centralized operator work stations or work from home operator control, the operators may be miles away from the device being controlled or even in a different state.

In the case of remote operators, both communications bandwidth and latency may be of concern. Bandwidth limits the overall amount of data that can be communicated between a device being controlled remotely and the operator workstation from which the device is controlled. While a device being controlled may include many cameras and/or sensors, depending on the data rate which can be supported only some of the data and information available at a device being controlled may be communicable to an operator. This may make it difficult for an operator to have the situational awareness that high resolution images of the scene area could provide in the case where bandwidth limits the ability to communicate such images to an operator at a high enough frequency to keep the operator well informed of what is going on at the site where the device being controlled is located.

While data rate relates to the amount of data which can be communicated, latency on the other hand relates to the amount of time required to communicate, e.g., data and/or control signals. Delays in transmission time between the device being controlled and the operator workstation reduce the operator's ability to control a device movement in a timely manner. In the case of changing a device's direction to avoid an obstacle or properly move in position to perform a task such as pick up, slide into or raise an object, delays in communication of commands to the device being controlled can result in the device moving more than expected and/or into objects.

Unfortunately, while an operator can see objects in a device's environment when displayed on the operator's screen, the operator may not have an intuitive understanding or appreciation in the amount of delay that may be associated with sending a positioning or other control command to a device since latency can vary depending on where the device being controlled is located and the latency of the communications link or links between the operator workstation and device being controlled. From a human interface perspective this can present problems since an operator used to controlling devices coupled to the operator workstation via low latency links may experience unexpected delays when switched to controlling a more remote device which is coupled to the operator workstation by high latency links. In addition, changes in latency due to loading of communications links and/or network hardware problems may also result in latency issues that are not obvious to a human operator.

When encountering latency higher than an operator is used to, a device may move further than expected before receiving a control command due to the time required to communicate the command or control signal to the device. This can cause an unexpected impact with an obstruction or more movement than was expected by a human operator.

Accordingly, it should be appreciated that remote control of devices including what is sometimes referred to as robot teleoperation has many technical challenges. Fundamental difficulties in teleoperation of a robot or other device are often caused as noted above by problems in bandwidth and latency of the communications connection between an operator workstation and the device being controlled. Inherent latency results in a lag from the remote operator station to the device being controlled and thus the situation that the robot or other device finds itself in. Bandwidth constraints can make it impossible to deliver the full set of information available in-situ at the robotic device to the remote operator limiting the operator's situational awareness.

In view of the above, it should be appreciated that there is a need to take into consideration communications latency when implementing a system which remotely controls devices which move. In addition, there is a need to take into consideration bandwidth constraints when deciding what visual or other information is provided to an operator workstation so that a device operator can maintain important situational awareness with regard to the area of device operation so that accidents such as collusions or misspositioning can be avoided to the extent reasonably possible.

SUMMARY

Various embodiments relate to facilitating operator control of a remote device, e.g., a robotic device such as a forklift or another device. In various embodiments the device being controlled and/or a component of the device, e.g., set of forks on a forklift, has the capability to move. In some embodiments the device includes cameras, LIDAR, sonar and/or other sensors which can capture information about an environment in which the device being controlled is operating with some or all of the information then being communicated back to an operator workstation, e.g., located remote to the device being controlled.

In various embodiments communications latency and/or bandwidth of a communications connection between a device being controlled and/or the operator workstation being used to control the device is measured.

One or more parameters of the system, e.g., operator control stations and/or the device, e.g., robot device, being remotely controlled, e.g., teleoperated, are altered in response to one or more of: i) communications latency, ii) communications bandwidth, iii) a task to be performed; and/or iv) environmental conditions. By changing such parameters, things such as maximum speed of device operation, a maximum acceleration rate or a maximum rate of movement of a device element such as forks of a forklift the device can be controlled or limited. The changing of parameters takes into consideration one, more or all of: i) communications latency, ii) communications bandwidth, iii) a task to be performed; and/or iv) environmental conditions For example, as latency increases, the maximum speed of a vehicle may be reduced by setting a parameter that controls the maximum speed to a lower value. The change in maximum speed may be, and sometimes is, proportional to the change in latency. By reducing the maximum speed of a vehicle such as a forklift being controlled, the minimum amount of time an operator will have to control the vehicle to alter course will increase. Thus, the operator will have more time to redirect the device being controlled even when operating at maximum speed, helping to offset the increased amount of time required to send control signals to the device from the operator workstation.

In various embodiments one, more or all of the following latency or data bandwidth related features are implemented.

1. The controlled device's speed, or speed of an element of the device such as an arm or fork portion used for lifting objects, is scaled as a function of latency. Higher latency in some embodiments results in lower device speed. This gives the operator finer-grained control in more-difficult situations. In such a situation, the human's experience changes slightly in the sense that device motion is slowed as latency is increased. While this might be slightly challenging to the operator, since the robot's responsiveness changes due to things outside the operator's control, e.g., communications latency, it changes in a way that increases safety and reduces the risk of accidents due to communications latency issues that the operator is likely to be unaware of. A device's speed, or speed of an element of the device may be, and sometimes is, adjusted based on features or aspects of the environment in which a device is operating and/or in which the task is to be performed. For example, when operating near fall offs, holes in a floor, stairs or people operating, speeds may be reduced as compared to when operating in environments without such features. Thus, a maximum speed near a loading dock with a drop off may be, and sometimes is, automatically adjusted to be lower than when operating in an open flat area with a solid floor surface. Similarly, speed may be, and sometimes is, limited or adjusted based on a task being performed. For example, when lifting a pallet of items, the lift speed of forks of a robotic forklift being remotely controlled may be, and sometimes is, controlled to be lower than when nothing is on the forks being moved. Similarly, when moving a pallet of items from one location in a warehouse to another location, maximum speed may be automatically controlled to be lower when moving a pallet of items than when a robotic device is moving without any items on it.

2. Data communicated to the operator is controlled based on the bandwidth that can be supported. The communicated data can be controlled/selected in a variety of ways based on the direction of motion and/or operation being performed. In some embodiments multiple camera views are communicated to the operator workstation when the bandwidth allows it. However, when bandwidth is more constrained, the view or views captured by cameras which is sent to the operator depends on the direction of motion and/or the operation being performed. For example, during forward movement a forward looking camera view is communicated to the operator workstation, while when moving sideways a camera view directed at a side angle may be, and sometimes is, communicated. During a lift operation, e.g., performed by a remotely controlled forklift, a view or views of the fork area, where a pallet or other items are being lifted or where the forks are being moved, is captured and communicated to the operator.

3. The operator's scene area of focus is monitored by monitoring the operator's eye orientation and scene area information is prioritized based on the operators focus. The viewing information is communicated to the device being controlled which then prioritizes scene areas in the environment on which the operator is focusing for video selection and communications purposes and then communicates high priority scene areas using the available bandwidth at a higher resolution and/or higher frequency than scene areas of lower priority. Thus, in some embodiments the system foveates the video being sent to the operator. Existing video codecs can do this by responding to low-bandwidth scenarios by decreasing the resolution of the portions of the video that is communicated to the operator based on the operator's focus with areas away from the operator's focus being communicated at lower resolution and/or being updated less frequently. Alternatively, and/or in addition to reducing resolution of a portion of a scene area image, cropping is used to limit the amount of image data communicated to an operator workstation, with the cropped image portion that is communicated corresponding to the area on which the operator is focusing or on which the operator should focus, given the operation being performed. Thus, in some cases, in the case of limited bandwidth, captured images are cropped before being sent to the operator workstation to focus the operator's attention on the parts of the scene that the operator really should see to complete the task being implemented. For example, if a device is being driven on a floor, ceiling scene portions can be, and sometimes are, cropped, since it doesn't particularly matter what the ceiling looks like from the perspective of safely driving the device remotely. However, if an operator is controlling a device to position forks in a pallet that is securely wrapped, it may not matter what the contents on the pallet are and the image may be cropped to remove the top of the items on the pallet from the communicated image and focus the operator's attention on the lower portion of the pallet into which the forks need to be inserted.

Foveation of captured images is implemented automatically in some embodiments based on bandwidth with the portions of captured images communicated to an operator at high resolution being picked dynamically based on an image foveation model learned from a corpus of previous operator interactions with the controlled device implementing the foveation operation on captured images.

In some embodiments the scene area communicated and/or displayed to the operator is intentionally modified to make the operator aware that some scene areas may be updated less frequently or may be of lower resolution than other scene areas, e.g., due to bandwidth constraints. In some embodiments the device communicating the scene area images to the operator workstation and/or the operation workstation augment the scene area to be displayed to the operator to indicate levels of adaptation being applied to the image being provided, e.g., displayed, to the operator and/or to indicate areas of uncertainty. For instance, in some embodiments a shadow is added to an image around a device's area of motion, e.g., around a vehicle/or vehicle forks, to indicate where the vehicle/forks have the potential to be based on the latency. In some such cases, the higher the latency the bigger the shadow applied, since the displayed image may not reflect motion which occurred since the time the image was captured. Operators can then react by moving more slowly, until the shadow is smaller and the operator is more confident in the location of a displayed vehicle or portion of a vehicle such as the location of the tip of a fork being inserted into a pallet so it can be lifted.

The illustration of areas of uncertainty can be indicated using a variety or combination of visual effects. For example, fading or motion blur can be used to indicate the staleness of data in a scene. For example, the longer the time since a portion of a displayed image has been updated, it might be made to become lighter darker or blurred. In this way an operator is made aware of position uncertainty due to possible movement during a time period corresponding to the determined latency and can take that into account when performing a positioning operation or other movement of the device or a portion of the device being controlled.

Various aspects and/or features relate to remote monitoring and/or remote operator control, e.g., of a vehicle. While various features and embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 5B is a second part of the flow chart of FIG. 5A showing the steps of an exemplary method implemented by a device subject to remote control in accordance with one exemplary embodiment.

FIG. 5 shows how FIGS. 5A and 5B can be combined to form a complete flow chart.

DETAILED DESCRIPTION

Figure 1:
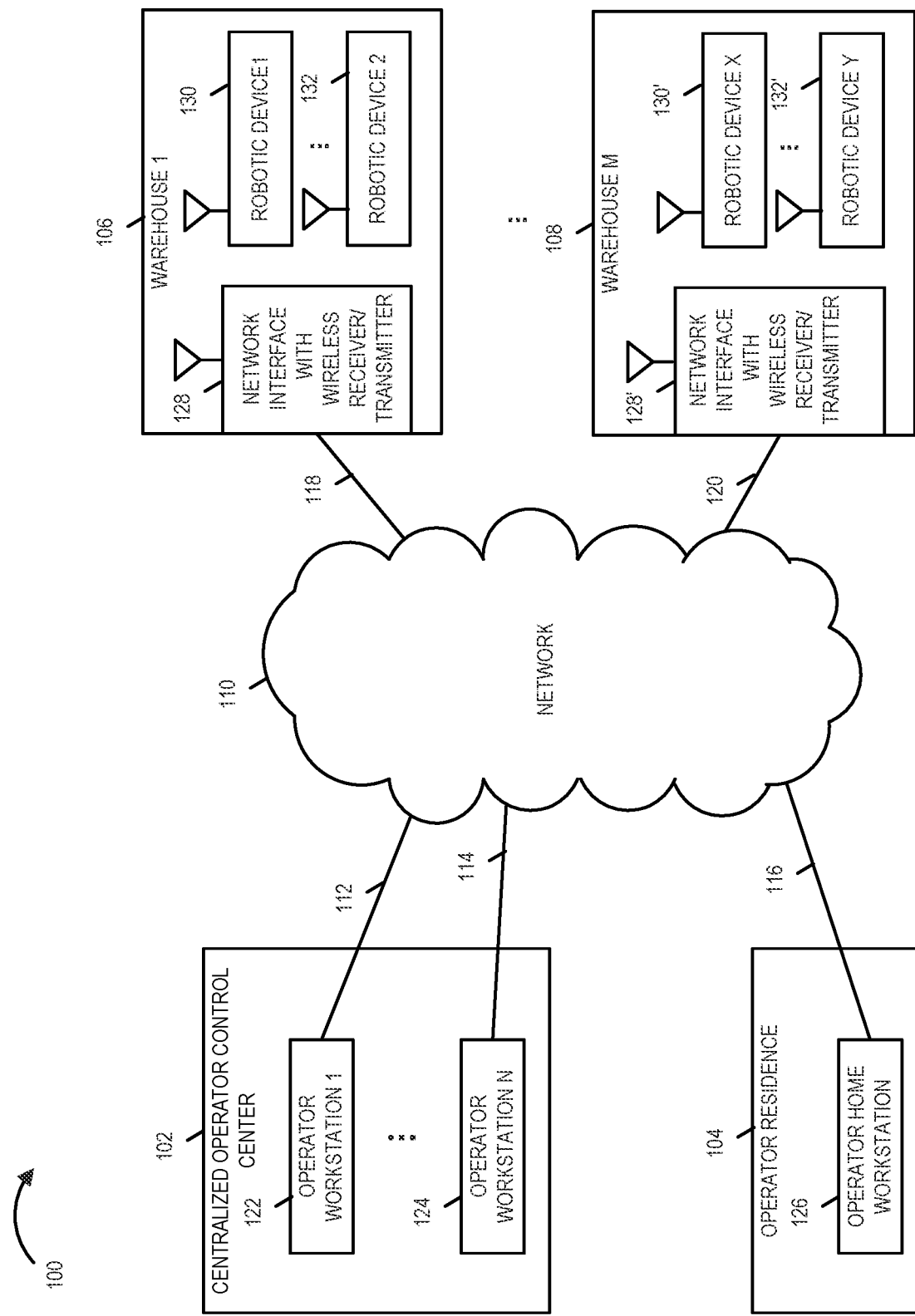
FIG. 1 is a drawing of a system implemented in accordance with one exemplary embodiment.

FIG. 1 is a drawing of a system 100 implemented in accordance with one exemplary embodiment. The system 100 includes a centralized operator control center 102, one or more operator residences 104, and a plurality of warehouses 106 through 108 which are coupled together for communications purposes via communications links 112, 114, 116, 118, 120 and a network 110. While two warehouses 106, 108 are shown, the centralized operator control center 102 may provide services to a large number of warehouses some of which may be located miles away or even in different states. The communications network 110 may be, and sometimes is, the Internet.

While the invention is being explained in the context of an example where the devices to be controlled are robotic forklifts located at warehouses, it should be appreciated that the methods and apparatus described herein relating to the remote control of devices which are moveable or have moveable elements such as forks or arms, can be applied to a wide range of devices that can be controlled remotely including different types of vehicles, assembly robots, etc. located in a wide range of different environments. Accordingly, it should be appreciated that the forklift related embodiment is exemplary and that the invention is not limited to being used solely with forklifts and can be used with a wide variety of controllable devices that can be remotely controlled.

The centralized operator control center 102 is shown located remote to the warehouses 106, 108 but may be located in, or adjacent to, one of the warehouses 106, 108 while being remote to other ones of the warehouses 106, 108. The centralized operator control center 102 includes a plurality of operator workstations 122, 124 which are coupled via corresponding links 112, 114 to the network 110 and thus can communicate with devices 130, 132, 130', 132' located at the various warehouses 106, 108 via the network 110.

Operator residence 104 includes an operator home workstation 126 which is the same or similar to the workstations 122, 124 located at the centralized operator control center 102 allowing an operator to work from his/her home and remotely operate robotic or other controllable devices 130, 132, 130', 132". Operator home workstation 126 is coupled to network 110, via communications link 116, through which it can communicate with devices to be controlled. While a single exemplary operator residence 104 is shown in FIG. 1, multiple operator residences may be present in the system 100. Human operators are at the workstations 122, 124, 126. As will be discussed below the operator workstations 122, 124, 126 include network interfaces through which the workstations can receive signals, video and other information from robotic devices 130, 132, 130', 132' and send control and other signals to the robotic devices 130, 132, 130', 132'

Each warehouse 106, 108 includes a network interface 128, 128' which supports a wired and/or fiberoptic connection 118, 120 to network 110 and also supports wireless communications using antennas. The network interfaces 128, 128' can be, and sometimes are, implemented as WiFi access points or other local wireless communications devices which have a wired and/or wireless interface and which can support communications between the robotic devices 130, 132, 130', 132' and network 110.

Robotic devices 130, 132, 130' and 132' can be controlled via the remote operator workstations 122, 124, 126 and communicate to the operator workstations 122, 124, 126 via a wireless connection to the network interface 128, 128' in the warehouse 106, 108 in which the device 130, 132, 130' 132' is located and network 110. The latency of the communications connection between an operator workstation 122, 124, 126 and a robotic device 130, 132, 130' and 132' will depend on the latency of the individual links which connect the devices and can vary over time, e.g., based on operator workstation location, robotic device location and/or network issues which can affect latency through the network 110. The latency can be measured in a variety of ways, e.g., with a workstation sending a signal and then measuring a time between when the signal is sent and a response to the signal is received. Similarly, a robotic device can measure the latency between the robotic device and an operator workstation controlling it by sending a signal to the workstation and then measuring the time between when the signal was sent and a response was received. The latency in one direction may be, and sometimes is, assumed to be half the round trip latency. Other techniques for measuring latency can also be used.

The amount of bandwidth that can be supported from a robotic device and an operator workstation can depend on wireless conditions at the warehouse at which the device to be controlled is located, network loading and a variety of other issues. Testing of how much bandwidth can be supported can be determined by sending a test load or other known amount of data over the communications path to be tested and the device receiving the data reporting back how much data was received in a test period of time. For example, robotic device 1 130 can communicate test data to operator work station 122 in different known amounts and the operator workstation 122 can report back based on the received test data the amount of data, and thus bandwidth, the data path between the robotic device 130 and operator workstation 122 reliably supports. The latency and bandwidth of a communications path can be tested/measured repeatedly at different points in time and adjustments in control parameters and/or what information, e.g., video data, is communicated modified in response to changes in the latency and/or bandwidth between the robotic device being controlled and the workstation used to control the device.

As will be discussed below, the operator workstations 122, 124, 126 can operate as device simulators with control and other inputs corresponding to the device to be controlled and simulated outputs, e.g., sounds and/or a displayed field of view. For example, the operator workstation 122 may and sometimes does include one or more pedals used to control forklift motion and levers/controls used to control lifting or lowering of forklift forks and/or forklift mast tilt controls.

Figure 2:
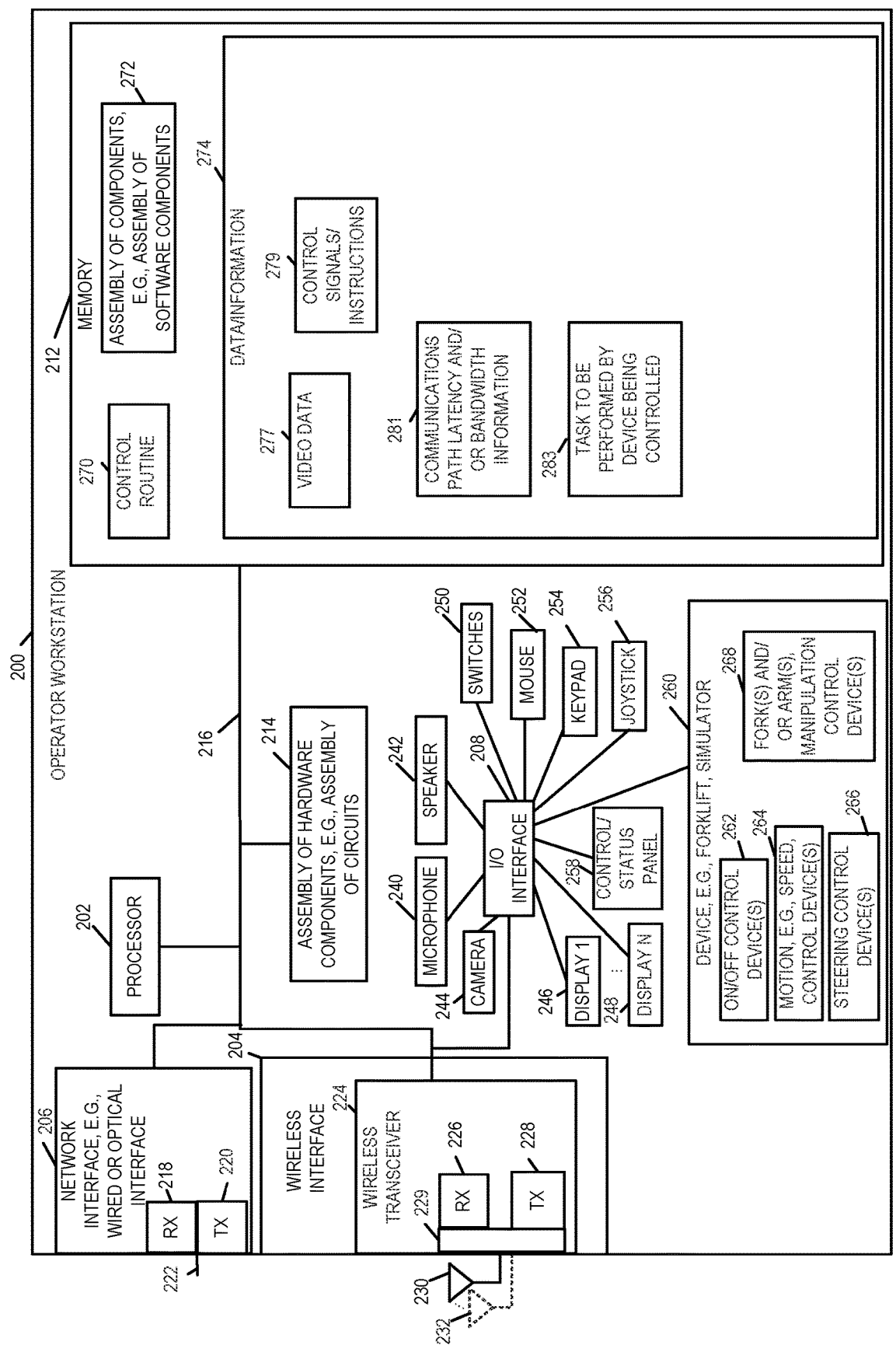
FIG. 2 illustrates an exemplary operator workstation than can be used as any of the operator workstations shown in FIG. 1.

FIG. 2 illustrates an exemplary operator workstation 200 that can be used as any of the operator workstations 122, 124, 126 shown in FIG. 1. The operator workstation 200 includes a first wired or optical network interface 206 in addition to a second wireless interface 204. The first network interface 206 includes a receiver 218 and a transmitter 220 coupled to fiberoptic or wired link 222 which couples to the operator workstation 200 to, e.g., communications network 110. The second wireless interface 204 includes a transceiver 224 that includes a wireless receiver 226 and a wireless antenna 228 which are coupled to one or more antennas 230, 232 by antenna control network 229. The antenna control network 229 can alter antenna connectivity depending on whether receive, transmit and/or both receive and transmit operations are to be performed and whether beam forming is supported. In cases where beam forming is not supported a single antenna 230 may be used. Thus, an array 230, 232 of antennas is optional and not used in all embodiments.

The first and second network interfaces 206, 204 are coupled to a processor 202, assembly of hardware components 214, memory 212 and I/O interface 208 via bus 216 allowing the components coupled to the bus 216 to exchange information, video data, control signals, etc. The processor 202 controls the operator workstation 200 to implement the methods described herein and to perform the steps described in the present application which are performed by the operator workstation under the direction of the control routine 270 stored in memory. In addition to the control routine 270 the memory 212 includes an assembly of components, e.g., an assembly of software components 272. The software components 272 include processor executable instructions which when executed by the processor 202 cause the processor to implement one or more functions performed as part of the methods described herein. The memory 212 also includes data/information 274 such as received video data 277, e.g., images, of an environment in which a controlled device is working, control signals/instructions 279 obtained from operator input, in addition to communications path latency and/or bandwidth information 281 which indicates the latency and/or bandwidth associated with a device being controlled from the operator workstation 200. The data/information 274 also includes information 283 indicating a task to be performed by the device being controlled by the operator of the operator workstation 200. The task may be indicated by the operator of operator workstation 200 or in many cases may be signaled to the operator workstation 200 by a robotic device when the device initiates an automatic request for operator control or operator assistance when a control device determines that an operation scheduled to be performed is risky and should not be implemented automatically without operator assistance. This is particularly the case with some semi-autonomous devices where a robotic device will perform some low risk operations automatically but automatically connect to an operator workstation when a risky operation such as picking up a pallet of items or working near an edge with a fall off is required. The task information 283 can also be automatically inferred by the processor 202 detecting a known sequence of operations corresponding to a particular task which is determined and then stored in memory 283. For example, a known operator initiated sequence of operations corresponding to approaching and picking up a loaded pallet may result in the operator workstation 200 or device being controlled determining that a loaded pallet pick up task is to be performed.

Various input and/or output devices are coupled to the I/O interface. In the FIG. 2 example these includes a microphone 240, speaker 242, camera 244, switches 250, mouse 252, keypad 254, joystick 256, control status panel 258 and one or more displays 246, 248. While some of these devices such as the displays 246, 248 can be used for device control related operations such as displaying video received from or corresponding to the device being controlled, in some embodiments device operator simulator components are also included to provide the operator an experience similar to what might be encountered if the operator were directly operating the device, e.g., forklift, at the site where the device is located. Device, e.g., forklift, simulator 260 is coupled to the I/O interface to provide device inputs which are the same or similar to those an operator of the device would use to control the device, e.g., forklift, if present at the device. The simulator 260 includes various on/off control switches 262 used for enabling/disabling different device functions, a motion, e.g., speed control device 264 such as a fuel pedal, one or more steering control devices 266, e.g., a steering wheel, and/or controls 268 for device attachments such as a forklift mast tilt control and/or fork raise/lower control. Input signals generated by the device simulator 260 are automatically converted into electrical signals and/or commands which are supplied to the I/O interface and thus the processor 202 via bus 216. The simulator 260 allows an operator to control the remote device while images of the device environment are displayed on one or more of the displays 246, 248.

As will be discussed below, the maximum speeds permitted at different times and/or the rate at which components of the device being controlled are allowed to move can be, and sometimes are, made a function of communications path latency. For example, the turning of the steering control device may result in a slower response and/or require more rotations in the case of higher latency than when there is low latency. In this way the operator controls automatically reflect to some extent the latency in the communications path. Similarly, the maximum speed in a given direction or the rate at which forks are raised/lowered may be, and sometimes are, scaled or limited based on latency. The slowing of speeds as communications latency increases gives changes in position more time to be captured on camera or detected by another sensor and communicated back to the operator for display. Thus the operator is less likely to make positional control errors due to a miss-understanding of device position even in cases where latency changes. Device speed and/or other control operations may be, and sometimes are, controlled based on the task to be performed and/or environmental conditions in addition to latency. While communications latency is used in some embodiments as a control factor, in some embodiments control parameters are adjusted based on environmental conditions and/or the task to be performed even if latency is not considered.

In some embodiments, the image or image portions of the environment displayed may be, and sometimes are, selected/controlled based on the amount of bandwidth available between the operator workstation 200 and/or the task to be performed.

Figure 3:
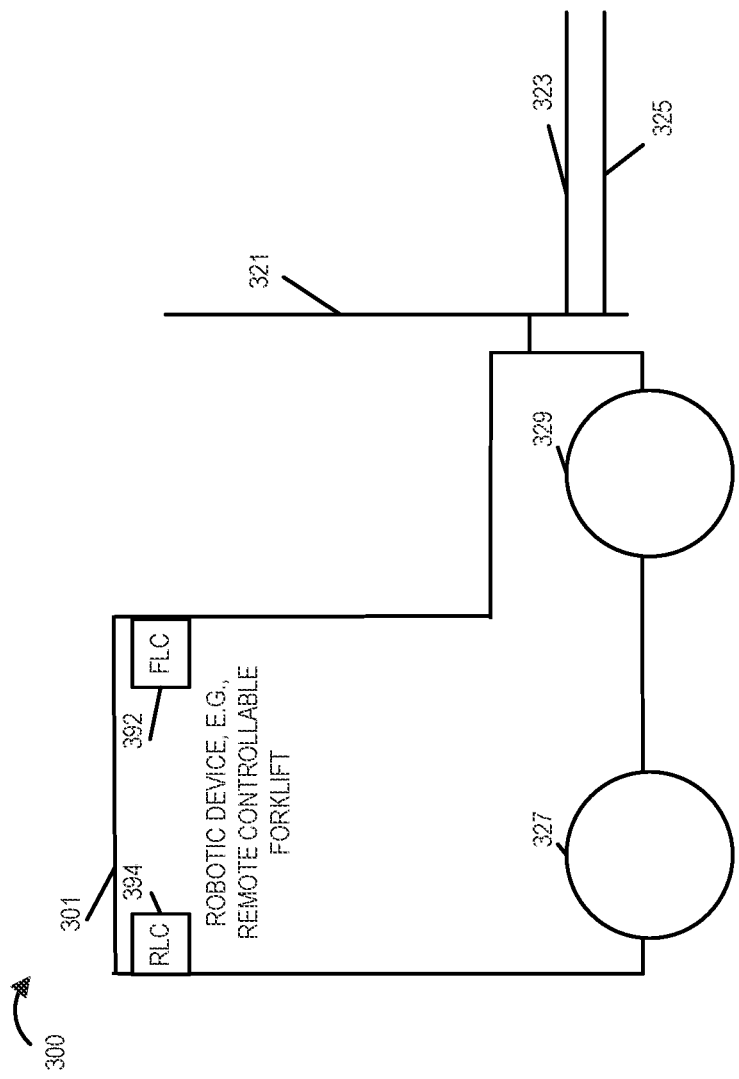
FIG. 3 illustrates an exemplary device, e.g., a forklift, which can be remotely controlled and which can be used in the system of FIG. 1 as any one of the robotic devices shown in FIG. 1.

FIG. 3 illustrates an exemplary device 300, e.g., a robotic forklift, which can be remotely controlled in accordance with some embodiments and which can be used in the system of FIG. 1 as any one of the robotic devices 130, 132, 130', 132' shown in FIG. 1. The forklift 300 includes a main housing 301 in which a motor and other components are housed or connected to, wheels 327, 329 a mast 321 which in various embodiments can be controlled to tilt and a set of forks 323, 325. The forks 323, 325 can be raised and lowered. The robotic device 300 includes a variety of cameras and other sensors as will be discussed further with regard to FIG. 4. In the FIG. 3 diagram a first forward looking camera (FLC) 392 is shown and a second rear looking camera (RLC) 394 is shown. The FLC 392 provides an image of the forklift area to facilitate an operator controlling a pallet pickup/lowering operation and/or other pallet manipulation as well as controlling forward travel of the forklift 300. The RLC 394 is used to provide a view of the area behind the forklift for backup or other operations. In the case where the bandwidth between the forklift 300 and operator workstation 122 used to control the forklift 300 supports the communication of multiple images, multiple views, e.g., RLC and FLC video, will be supplied to the operator workstation 122 to provide a large amount of situational awareness. In cases where the available bandwidth will not support multiple views, one of the camera outputs may be prioritized while feeds from the other camera outputs are discontinued or transmitted less frequency than from the highest priority camera. In some embodiments foveation is supported with portions of a camera output, images, being processed, e.g., subject to cropping and/or low resolution representation, based on what portion of a scene the operator working at the operator workstation 122 selects to view at a given time. The viewing, e.g., field of view information, is detected using a sensor, e.g., eye tracking sensor, at the workstation and communicated to the device being controlled to facilitate foveation and/or selection of which camera feed or feeds to supply to the operator workstation when bandwidth is limited.

Having generally described the device, e.g., robotic forklift, 300 to be controlled with regard to FIG. 4 it will now be discussed in greater detail with reference to FIG. 4.

Figure 4:
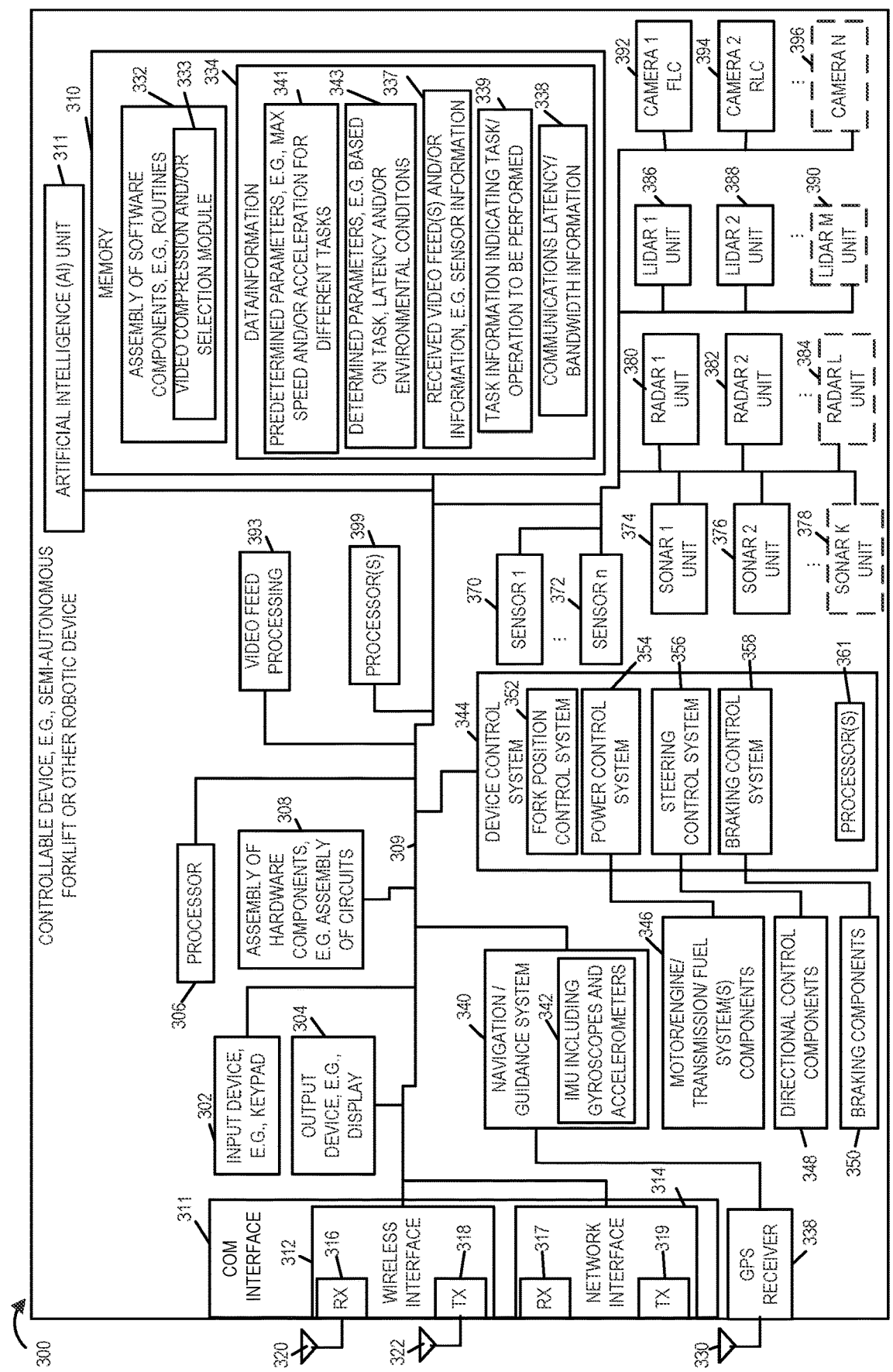
FIG. 4 is a block diagram of the exemplary device of FIG. 3 showing various components of the exemplary device in block diagram form.

FIG. 4 is a block diagram of the exemplary device 300 of FIG. 3 showing various components of the exemplary device in block diagram form and in greater detail then is shown in FIG. 3.

Controllable device 300, e.g., a robotic forklift or another device, includes an input device 302, an output device 304, a processor 306, an assembly of hardware components 308, e.g., an assembly of circuits, memory 310, a communications interface (COM interface) 311, a navigation/guidance system 340, a vehicle control system 344, a plurality of sensors (sensor 1 370, . . . , sensor n 372), a plurality of sonar units (sonar unit 1 374, sonar unit 2 376, . . . , sonar unit K 378), a plurality of radar units (radar unit 1 380, radar unit 2 382, . . . , radar unit L 384), a plurality of LIDAR units (LIDAR unit 1 386, LIDAR unit 2 388, . . . , LIDAR unit M 390), a plurality of cameras (FLC camera 1 392, RLC camera 2 394, . . . , camera N 396), and an artificial intelligence (AI) unit 311 coupled together via bus 309 over which the various elements may interchange data and information. While a combination of sensors, sonar, radar and LIDAR units are shown in the example the device 300 may include some or none of these sensors/measuring devices depending on the embodiment. The communications interface 311 includes a wireless interface 312 and a network interface 314. The wireless interface 312 includes a receiver circuit 316 and a transmitter circuit 318. The network interface 314 includes a receiver circuit 317 and a transmitter circuit 318. The robotic device 300 can communicate with the operator workstation using either the wireless interface 312 and/or network interface 314. In the case of wireless communications, the communications may occur directly with the operator workstation wirelessly but in many cases wireless signals are communicated between a warehouse network interface 128 such as a WiFi access point and then between the WiFi access point and operator workstation via one or more wired or optical connections.

Input device 302, e.g., a keypad, is used for receiving manual input, e.g., from a service technician, e.g., to alter device settings and/or access information stored on the device, e.g., robotic forklift. The output device(s) 304 e.g., a display and/or status lights or indicators and/or an audio output device, e.g., alarm, siren, speaker, etc., is used for outputting information, warnings, and/or status indications to an operator of the device 300, a device monitoring individual, or a device service person. The processor 306, e.g., a CPU, executes routines, e.g., routines loaded into the processor 306 from memory 310 to control the operation of the robotic device 300. A video compression and/or selection module 333, included in the assembly of software components 332, controls video selection and/or compression and thus in some cases controls what video or images will be returned to the operator workstation controlling the device 300.

Memory 310 includes assembly of software components 332, e.g., routines, and data/information 334. In some embodiments, a component, e.g., a routine, in the assembly of software components 332, when executed by processor 306, 399, or 361, implements a step of an exemplary method, e.g., the method of flowchart 500 of FIG. 5. The assembly of software components 332 includes the video compression module and/or selection module 333. Data/ information 334 includes information 337 including received video feed(s) and/or information, e.g., sensor information, captured video and/or information, e.g., sensor information, from one or more of the cameras/sensors. The memory 310 includes operating parameter information such as maximum device speed and/or acceleration and/or max speed and/or acceleration of components, e.g., forks, which are part of the robotic device 300. Memory 310 includes a set of predetermined parameters 341, e.g., max speed and/or max acceleration for different tasks which maybe and sometimes are performed by the robotic device. For example, the predetermined parameters 341 may specify a first maximum speed for the robotic device 300 moving between locations with items on its forks and a second lower maximum speed for the robotic device 300 moving with one or more items on its forks.

In addition, the parameters may include a maximum acceleration for one, more or all tasks for which a maximum speed is indicated. Thus, in some embodiments the predetermined parameters include pairs of maximum permitted speed and maximum permitted acceleration for multiple tasks which can be performed. Tasks for which maximum speed and acceleration are specified can include tasks relating to movement of a device component such as forks of the robotic device 300. In one embodiment the predetermined parameters include a first predetermined maximum fork raising and/or lowering speed, and corresponding maximum fork acceleration, for the task of raising or lowering the forks when the forks are empty and a second lower predetermined fork raising and/or lowering speed, and corresponding second maximum fork acceleration, for the task of raising or lowering the forks when the forks are loaded, e.g., with a pallet or other item(s). The predetermined parameters may be and sometimes are maximum speeds/accelerations which can be safely supported for various tasks likely to be performed by the robotic device 300, e.g., under operator control, in the absence of communications latency problems or environmental hazards such as the presence of people or drop offs such as stairs, pot holes or the edge of a loading dock off of which the robotic device 300 might fall.

Determined parameters 434 are operating parameters, e.g., determined by processor 306, that the robotic device should use to perform a determined task based on communications latency and/or environmental conditions present at the time the task is to be performed under control of a remote operator workstation 122. The determined parameters 434 include maximum device speed and acceleration and/or maximum speed of a device component, e.g., forks and/or corresponding maximum acceleration. The determined parameters 434 will in many cases be lower than the predetermined parameters for the task to be performed because they may and often will have been modified, e.g., lowered, based on communications latency between the robotic device 300 and operator workstation controlling the device and/or because of the presence of one or more environmental hazards such as the presence of a drop off or a human in the robotic device's operating area, e.g., the environment in which the robotic device is to perform the task for which the control parameters 434 are determined.

The memory 310 also includes information 338 on a determined communications latency and/or bandwidth between the controllable device 300 and the operator workstation 122 being used to control the device 300 and task information 339 indicating a task to be performed by the device 300. The task to be performed, may be determined based on stored instructions or e.g., by the artificial intelligence unit 311 based on a sequence of operations initiated by a remote operator.

Wireless interface 312 includes a wireless receiver 316 coupled to receive antenna 320 via which the device to be controlled, e.g., forklift 300, receives control signals, commands from the operator workstation. The wireless interface 312 also includes a wireless transmitter 318 coupled to transmit antenna 322 via which the device 300 transmits wireless signals, e.g., sensed information and/or video, along with task information in some cases. In some embodiments, there is a wireless link between the wireless interface 212 and a network interface 128 or 128'. The network interface, e.g., network interface 128 is responsible for acting as an intermediary and for communicating signals sent using network 110 to/from the controllable device 300. Network interface 314 includes a receiver 317 and a transmitter 319, via which the device 300 can communicate with test equipment and/or which is used to configure the device 300, e.g., when the device is parked, e.g., at a depot, garage, and/or service, repair and/or maintenance facility into which a wired or fiber connection can be made with the network interface 314.

Controllable device 300 further includes an embedded GPS receiver 338 coupled to GPS antenna 330, which receives GPS signals and determines time information, a position fix, e.g., latitude/longitude/altitude, and/or velocity information for the device 300. The output of GPS receiver 338 is fed as input to navigation/guidance system 340. Navigation/guidance system 340 includes an inertial measurement unit (IMU) 342, e.g., an IMU on a chip, including gyroscopes and accelerometers. Navigation/guidance system 340, provides filtered location, attitude, acceleration and/or velocity information, and is used to route the device 300, e.g., a forklift, along an intended path. While GPS is used when GPS signals are available, in in indoor situations the device 300 may operate without GPS signals/information.

Device control system 344 includes a power control system 354, a steering control system 356, a braking control system 358, and processor(s) 361. Power control systems 354 is coupled to motor/engine/transmission/fuel system(s) 346, included in device 300, e.g., a forklift 300, and is used to control motion of the device 300, e.g., forklift 300, e.g., forward, reverse, speed, acceleration, deceleration, etc., motion of the forks 323, 325 and/or fork mast 321 which in some embodiments can be tilted. Steering control system 356 is coupled to directional control components 348, e.g., steering motors, steering linkages, rack and pinion, gear box, etc., and is used to control the direction of device 300, e.g., forklift 300. Braking control system 358 is coupled to braking components 350, e.g., brake actuators, brake cables, wheel speed sensors, wheel motors, ABS system components, etc., included in device 300, e.g., forklift 300, and is used to control braking of the device, e.g., forklift 300. Sensors (370, . . . , 372) include, e.g. speed sensors, motion sensors, proximity sensors, etc., and collect information used to control device 300, e.g., forklift 300. Sonar units (374, 376, . . . , 378) are used to perform distance measurements to other objects in the vicinity of the device 300, e.g., forklift 300. Radar units (380, 382, . . . , 390) are used to detect and measure the speed of other objects in the vicinity of the device 300, e.g., forklift 300. Light detection and ranging (LIDAR) units (386, 388, . . . , 390) use lasers or other light to detect and range objects in the vicinity of the device 300, e.g., forklift 300. Cameras (392, 394, . . . 396), are mounted and oriented on the device 300 to capture different fields of view, capture images, e.g., video feeds, which are streamed, e.g., selectively streamed, to the operator control station 122, and/or are used to provide assistance in automatically moving or re-positioning the device 300, e.g., forklift 300, e.g., when performing some tasks in a full automated manner.

Video feed processing 393 receives video feeds from cameras on the device 300, e.g., forklift 300 and provides selection, compression, cropping and/or foveation on captured images, e.g., images of the environment and/or scene area in which the device, e.g., forklift is being used, prior to the images being communicated to the remote operator. Processing performed by video feed processing unit 393 can be, and sometimes is, based on information about the scene area an operator is looking at which is detected at the operator workstation 122 and communicated to the controllable device, e.g., forklift 300, in some embodiments.

Figure 5A:
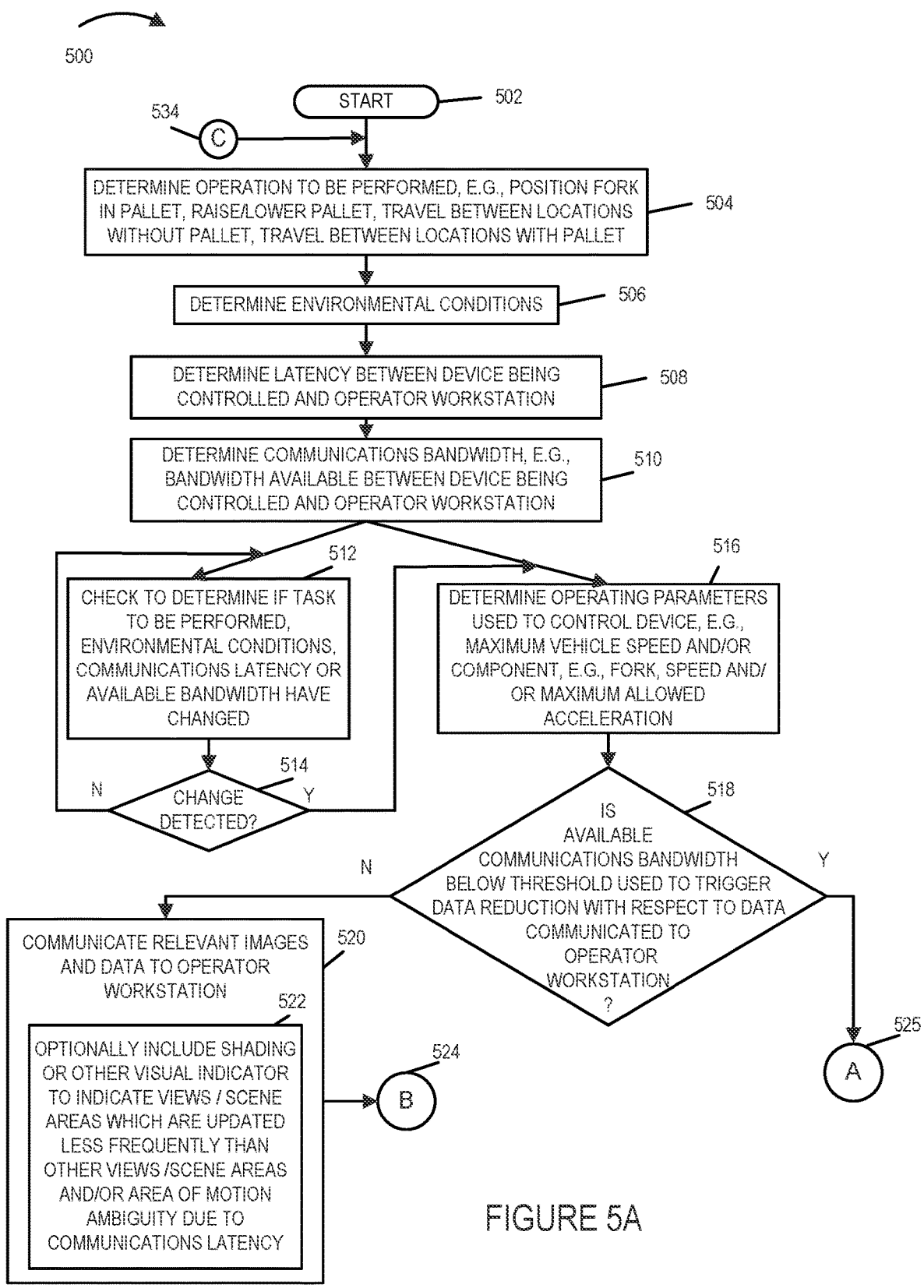
FIG. 5A is a first part of a flow chart showing the steps of an exemplary method implemented by a device subject to remote control in accordance with one exemplary embodiment.

FIG. 5 is a diagram 501 which shows how FIGS. 5A and 5B are to be combined to form a complete flow chart. The combination is a flow chart showing the steps of an exemplary method implemented by a device subject to remote control from an operator workstation in accordance with one exemplary embodiment.

Referring now to FIG. 5, the method 500 begins in start step 502 when a device to be controlled 130 begins operating. Operation proceeds from start step 502 to determination step 504 in which a determination is made as to the operation to be performed by the device to be controlled 130, e.g., by an exemplary robotic forklift 300. For example, the device 300 may determine, based on a previous sequence of operations or from a command from operator workstation 122 that an operation such as positioning the forks of the forklift in a pallet, traveling between locations without a pallet, traveling between locations with a pallet, lifting a pallet or lowering a pallet is to be performed. This information may be, and sometimes is, stored in the memory of the device 300 and/or communicated to the operator workstation 122 which is to be used to remotely control device operation.

With the operation to be performed having been determined in step 504 operation proceeds to step 506 in which environmental conditions are determined. This step maybe and sometimes is performed by using automatic object rejection to detect objects such as people, potholes or drop offs which are common in the case of stairs or loading docks in environmental images captured by one or more cameras on the device, e.g., forklift, to be controlled. Such information can be, and sometimes is, used to trigger reductions in maximum permitted device speed and/or the use of slower than maximum supported rates of acceleration. Slowing operation in the presence of drop offs or holes can reduce the risk of the device falling into a hole or off a drop off by allowing an operator more time to assess the position of the device relative to the drop off or hole than would be possible if the device operated at higher speeds. Similarly slowing the maximum speed or maximum rate of acceleration when the device being controlled is in the presence of humans can give the humans present in the area more time than would otherwise be available to observe and react to device movement or changes in speed.

Operation proceeds from step 506 to step 508 in which communications latency for the communications connection between the device 300 being controlled and the operator workstation 122 used to control the device is determined, e.g., measured. This can be done by sending a signal to the workstation 122 from the device 300, receiving a response and determining the round-trip time between sending of the signal and receipt of the response. The communications delay and thus latency between the device 300 and operator workstation 122 is determined to be ½ the measured round-trip time. Images sent to the operator workstation will be subject to the communications delay due to this latency meaning the images showing where the device 300 is within the environment will be time delayed by at least this amount. In many cases the device 300 being controlled will have moved during the time used to send images or position information to the operator workstation with the movement being greater the longer the delay assuming motion at a constant rate. Thus, the communication latency leads to device position uncertainty from the perspective of the operator viewing an image captured by the device and then communicated to the operator workstation.

Operation proceeds from latency determination step 508 to communications bandwidth determination step 510. In step 510 the communications bandwidth between the device 300 being controlled and the operator workstation 122 is determined, e.g., measured. This information can be useful in determining if the communications connection can support the expected amount of traffic that can result if video and other information relating to device operation is sent from the device 300 to the workstation 122 without implementing data reduction techniques.

Operation proceeds from step 510 to steps 512 and 516. Step 512 is performed on a periodic or other basis. In step 512 a check is made to determine if the task to be performed has changed, if environmental conditions, communications latency or available communications bandwidth have changed since the last time these things were determined. Step 512 in some embodiments includes performing steps 504, 506, 508 and 510 and comparing the results to the last results. If a change is detected in step 512 operation proceeds via step 514 to step 516 so that new operational parameters can be determined based on the latest determined values, e.g., the new value determined in step 512. However, if no change is detected in step 512 the previously determined operational parameters remain valid, and the check 512 is repeated (see no change path) at the next check time period.

In step 516 which is reached from step 510 in the initial pass through the flow or via step 512 when a change is detected, operating parameters used in controlling the device 300 are determined based on the determined task to be performed, environmental conditions, communications latency, and/or amount of available communications bandwidth. In step 516 parameters such as maximum vehicle speed, maximum forklift raise/lower speed, and maximum vehicle acceleration are determined. Different maximum vehicle speeds can be, and sometime are, set for different tasks. For example, the maximum speed for moving between warehouse locations without a pallet may be higher than when the forklift 300 is holding a pallet of goods. The maximum speed when approaching a pallet to pick it up may be lower than that of traveling between warehouse locations. Different predetermined maximum vehicle speeds are stored in device memory for different tasks to be performed in some embodiments. In some embodiments vehicle speed is set to a lower maximum speed when humans are present, potholes are present or drop offs are present in the environment where the device 300 is being operated as compared to when such things are not present. In some embodiments maximum speed and/or acceleration are reduced as a function of latency with latency above a threshold level resulting in reductions in the maximum speed and/or maximum acceleration as compared to the maximum speed and/or maximum acceleration determined based on the task to be performed and environmental conditions. By reducing maximum speed and/or maximum acceleration based on latency, the amount of position uncertainty an operator may experience between image updates showing device position can be reduced or limited as compared to cases where the device was permitted to operate at higher rates. Given that higher latency can cause higher positional uncertainties from the operator perspective, reducing maximum vehicle speed and/or maximum acceleration can help offset the effect of the high latency and limit the positional error the operator encounters in the displayed images.

Operation proceeds from step 516 to step 518. In step 518 a check is made to determine if the available communications bandwidth is below a threshold used to trigger data reduction with respect to data communicated to the operator workstation. The data reduction threshold is set at a level that is expected to provide the operator sufficient information, e.g., images or video, to make reliable control decisions without implementing data reduction techniques. If in step 516 it is determined that the available bandwidth is not below the threshold used to trigger data reduction with respect to data communicated to the operator workstation, operation proceeds to step 520 in which relevant images, e.g., captured by a camera on the device 300 of the area in which the device is operating and/or other data such as sensed distance information to objects, is communicated to the operator workstation 122 used to control the device 300. As part of step 522 the device 300, in some but not all embodiments, includes sub step 522 in which shading or another visual indicator of scene areas which are updated less frequently than other scene areas or where areas of motion ambiguity exist due to communications latency along with an indication of the potential amount of position ambiguity. This may be shown via a blurred area in an image with the area corresponding to the amount of position ambiguity. Operation proceeds from step 520 via connecting node B 524 to step 530 shown in FIG. 5B.

If in step 518 it was determined that the amount of communications bandwidth that is available is below the threshold level used to trigger data reduction operation proceeds from step 518 to step 526 via connecting node A 525. In step 536 the device 300 being controlled prioritizes camera views and/or data to be communicated for the operation, e.g., task, to be performed based on the latency and/or bandwidth constraints. It is determined in step 526, that based on the operation to be performed and image prioritization that some available camera views should not be transmitted to the operator workstation. For example, when the task is to pick up a pallet the rear camera view may not be transmitted to the operator workstation while the front camera view or a portion of the front camera view is prioritized for transmission. Information from the operator workstation may be, and sometimes is, received and used in step 526 and/or 528 when determining how to process and communicate scene, e.g., captured image data, to the operator workstation 122. Foveation may be, and sometimes is, used to communicate scene areas where the operator is focused on at higher resolution than peripheral areas since such areas will be given, in step 526, higher priority than areas the operator is not looking at.

Operation proceeds from step 526 to step 528 in which higher priority views and/or scene areas are communicated to the operator workstation 122 at a higher resolution or with a higher update rate than power priority scene areas or views. After communicating one or more environmental images to the operator workstation 122 for display operation proceeds to step 530, in which operator control information is received. The control information may be automatically generated by the operator workstation 122 in response to an operator turning a steering wheel, stepping on a gas or other acceleration pedal or moving some other control used to control device 300 movement, speed, acceleration or braking.

Then in step 532 the controllable device 300 performs one or more operations based on the received operator control information and the determined operational parameters. In implementing a command, the maximum speed and/or maximum acceleration may be, and sometime is, constrained based on latency with the maximum speed and/or maximum acceleration being lower the greater the amount of communications latency. Other environmental conditions, such as the presence of people and/or the presence of drop offs in the environment may also limit the maximum speed below that associated with an operation to be performed. Thus, in step 532 when a maximum speed or maximum acceleration is signaled, the actual implemented speed or implemented acceleration may be a function of the received command but also detected environmental conditions and/or communications latency. Operation is shown proceeding from step 532 to step 504 via connecting node C 534 to show that the process is performed on an ongoing basis and can be used to remotely control the device 300 to perform multiple sequential operations and/or a combination of autonomous and operator controlled operations as part of an ongoing sequence.

Figure 6:
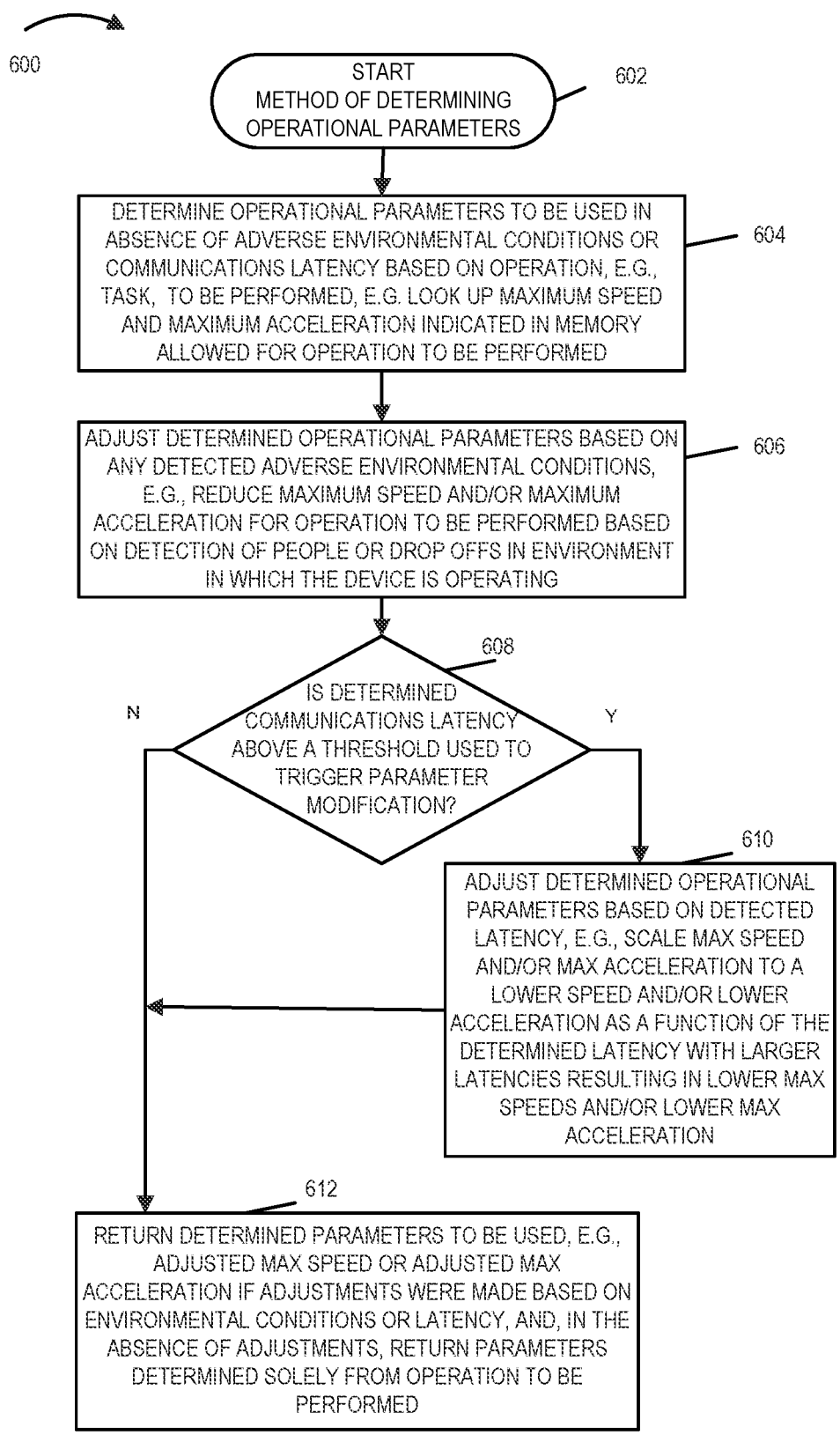
FIG. 6 shows the steps of determining operational parameters based on a task to be preformed, environmental conditions and/or communications latency between a device being controlled and a workstation from which an operator controls the device.

FIG. 6 is a drawing 600 showing the steps of an exemplary method used to determine operational parameters based on a task to be preformed, environmental conditions and/or communications latency between a device being controlled and a workstation from which an operator controls the device that is used in some embodiments. The method 600 shown in FIG. 6 can be initiated by a call from the determine operating parameters step 516 of FIG. 5 and will return operation parameters such as maximum device speed and acceleration to be used for a particular operation.

The method 600 starts in step 602 when the routine is called, e.g., by step 516, and operation then proceeds to step 604. In step 604 operational parameters to be used in the absence of adverse environmental conditions or communications latency are determined for the operation to be performed, e.g., by looking up in memory maximum speed and acceleration values to be supported for the operation to be performed. With the maximum speed and acceleration that can be used for the intended device operation having been determined in step 604 operation proceeds to step 606. In step 606 determined operational parameters are adjusted based on any adverse environmental conditions which were detected such as the presence of one or more humans and/or drop offs in the environment in which the device being controlled is operating. No adjustments will be made in step 604 if no adverse environmental conditions were detected. Adjustments made in step 604 normally include lowering the maximum permitted speed and/or the maximum permitted acceleration due to the presence of a human being or drop off in the environment of operation.

Operation proceeds from step 606 to step 608 in which a communications latency check is made to determine if additional parameter, e.g., max rate, adjustments should be made due to determined communications latency. If in step 608 it is determined that the determined communications latency is above a threshold used to trigger parameter modification based on latency operation proceeds to step 610 otherwise operation proceeds directly to parameter return step 612.

In step 610 operational parameters, e.g., max permitted speed and/or max acceleration are adjusted, e.g., lower, based on the detected communications latency. The greater the detected communications latency the more one or more parameters are lowered to reduce the maximum permitted device speed or acceleration. In some embodiments step 610 involves scaling one or more operational parameters based on the size of the determined latency with a larger latency leading to a greater reduction in the maximum speed and/or maximum acceleration.

Operation proceeds from step 610 to parameter return step 612. In parameter return step 612 the determined operational parameters to be used for control of the device for the determined operation to be performed are returned for use, e.g., to the step which called the routine 600. In the case where no parameters were adjusted the unadjusted parameters determined based on the operation to be performed will be returned. However, in the event that operation parameters determined based on the operation to be performed were adjusted in steps 606 or 610 due to adverse environmental conditions or communications latency the adjusted operation parameter values, e.g., reduced maximum speed value or reduced maximum acceleration value, will be returned for use in controlling device operation.

Figure 7:
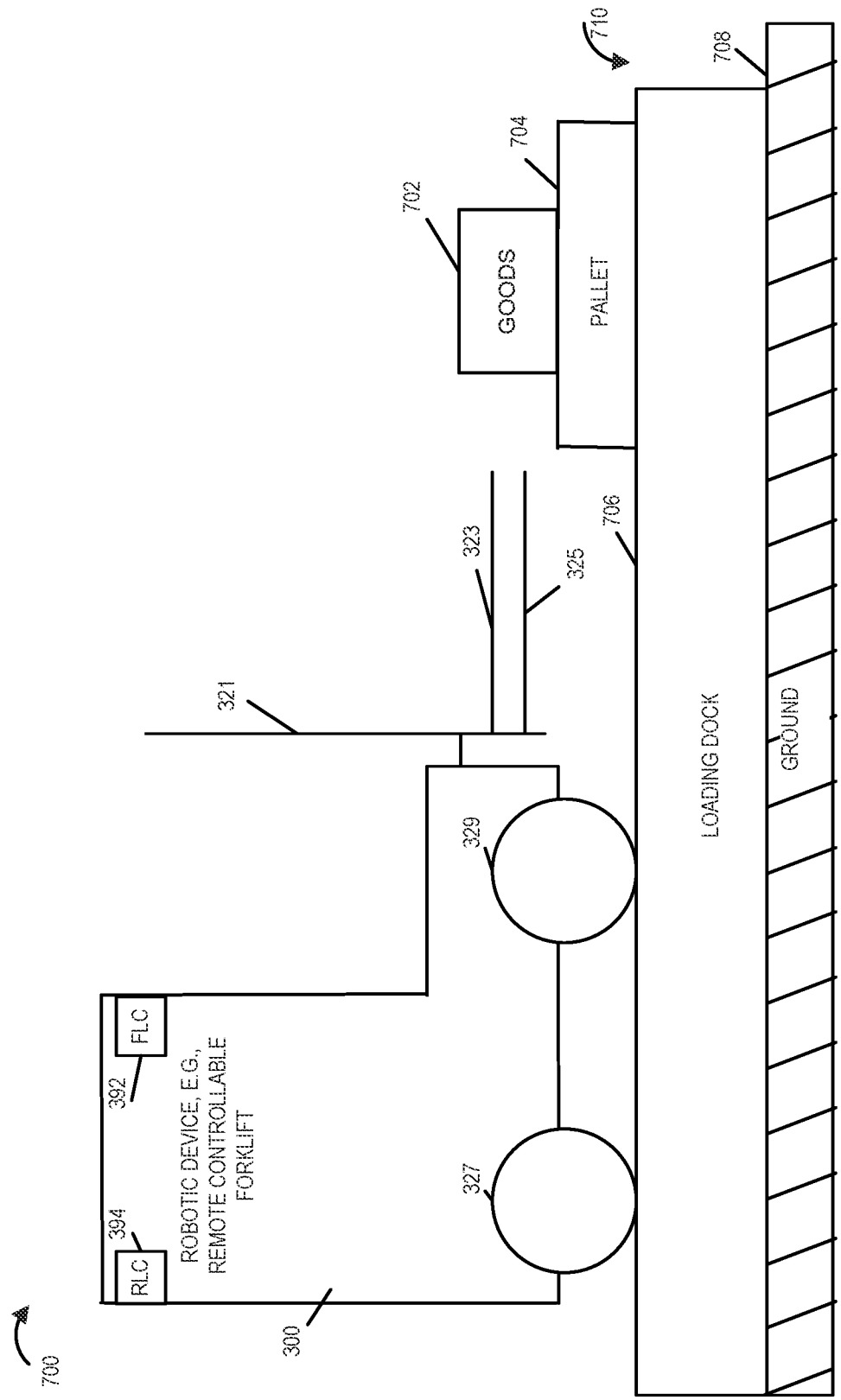
FIG. 7 is a diagram of an exemplary warehouse environment including a loading dock and remotely controlled forklift which can be used to lift a pallet of goods and/or perform other actions.

Various adverse environmental factors, e.g., a drop off in the environment, can be understood in view of the FIG. 7 diagram 700 which shows a drop off 710 in an environment, e.g., loading dock area in which a robotic forklift 300 may operate.

FIG. 7 is a diagram 700 of an exemplary warehouse environment including a loading dock 706 and remotely controlled forklift 300 which can be used to lift a pallet 704 with of goods 702 and/or perform other actions. In the FIG. 7 example the loading dock 706 on which the forklift 300 operates is above ground 708. A falloff 710 is present at the edge of the loading dock. The fall off 710, a drop, can and will automatically be detected in the image captured by forward looking camera FLC 392. The drop off 710 which is common for loading docks presents an environmental risk since the forklift and/or pallet 704 of goods can fall or be knocked off and drop to the ground 708. To reduce the risk of such an occurrence the maximum operational speed of the forklift 300 will be automatically reduced as compared to the maximum speed permitted in a flat open area to reflect the environmental hazard and reduce the risk of an accident.

Figure 8:
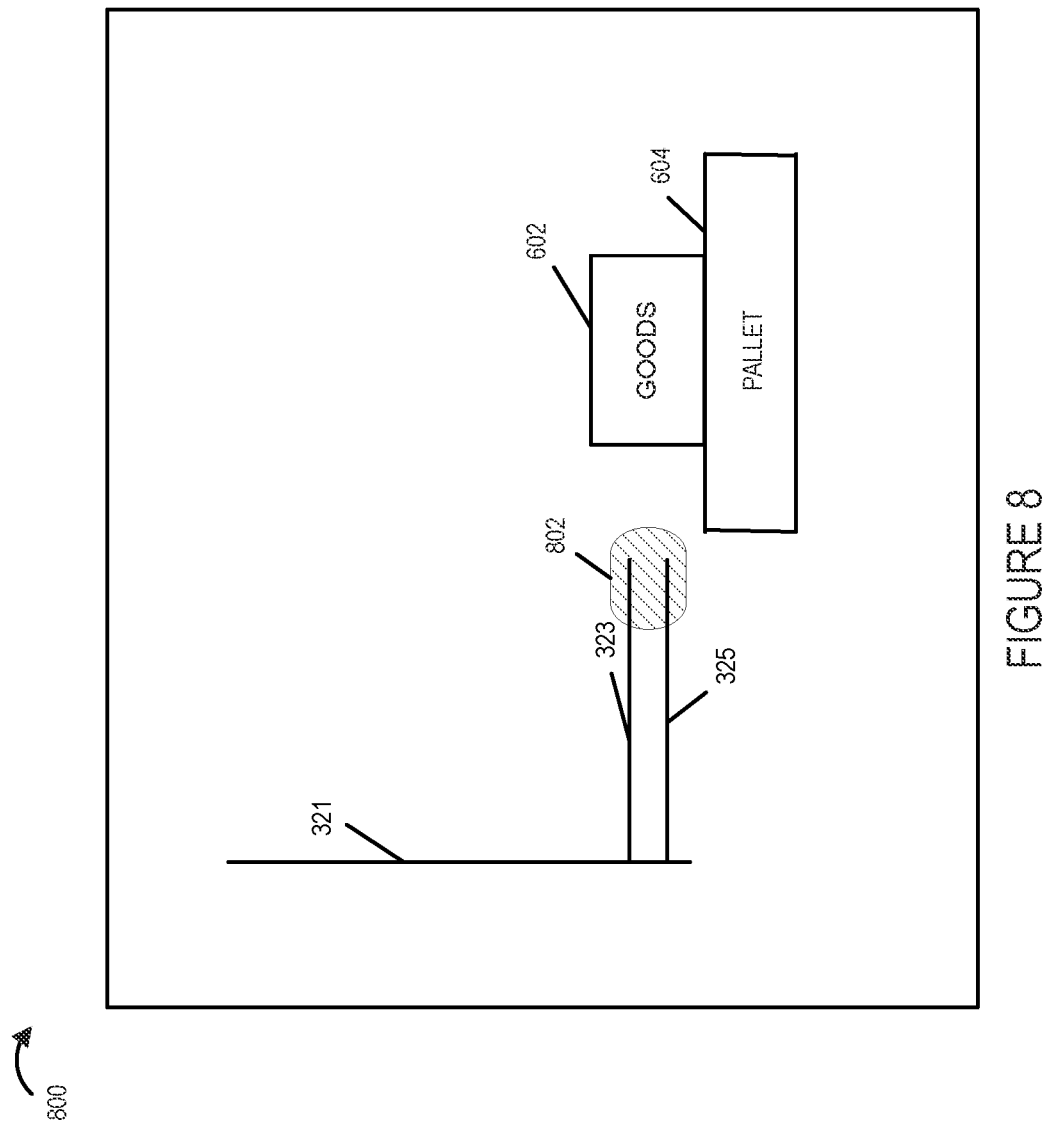
FIG. 8 is a diagram showing an exemplary forward camera view which can be communicated to an operator workstation for display and which has been augmented to show an area of position uncertainty due to communications latency.

FIG. 8 is a diagram 800 showing an exemplary forward camera view which can be communicated to an operator workstation for display and which includes augmentation in the form of shading to show an area of position uncertainty 802 due to communications latency. The size of the area 802 will be larger for large latencies. Thus, in some embodiments the size of the indicated area of position uncertainty is smaller when there is a lower communications latency than when there is a large communications latency. The operator can take the visual indication of positional uncertainty into account when controlling the forks 323, 325 of the forklift 300.

It should be appreciated that while a forklift is shown as the exemplary device subject to remote control in various embodiments the remotely controlled device could be a truck, car, crane or another type of moveable device.

Numbered List of Exemplary Method Embodiments

Method Embodiment 1. A control method, comprising: determining (508), at a device to be controlled, a communications latency between the device to be controlled and an operator workstation; determining (516) one or more device operating parameters based at least the determined communications latency; receiving (530) a control signal from the operator workstation; and implementing (532) a device operation based on the received control signal and a device operating parameter determined based on the determined communications latency.

Method Embodiment 2. The method of Method Embodiment 1, wherein the determined operating parameters include a first operating parameter which is one of a maximum device speed or a maximum acceleration.

Method Embodiment 3. The method of Method Embodiment 1, further comprising: determining (504) a device operation to be performed; and wherein determining (516) one or more device operating parameters based at least the determined communications latency includes determining the first device operating parameter based on both the determined communications latency and the device operation to be preformed.

Method Embodiment 4. The method of Method Embodiment 3, wherein the determined first operating parameter is a maximum device speed, said determined maximum device speed being lower the greater the determined communications latency is.

Method Embodiment 5. The method of claim 4, wherein determining the maximum device speed includes scaling a maximum permitted device speed permitted to be used when the latency is below a latency threshold by the determined amount of communications latency (e.g., the maximum permitted device speed is multiplied by a scaling factor which is a fraction corresponding to a value smaller than one).

Method Embodiment 6. The method of claim 3, further comprising: determining (506) one or more environmental conditions; and wherein determining (516) one or more device operating parameters based at least the determined communications latency includes determining the first device operating parameter based on the determined communications latency, the device operation to be preformed and a detected environmental condition.

Method Embodiment 7. The method of Method Embodiment 6, wherein the determined environmental condition being a pothole or drop off in the environment in which the device being controlled is operating; and wherein determining the first device operating parameter includes using a lower value (e.g., lower maximum speed) for the first device operating parameter due to the detected pothole or drop off than would be used in the absence of a detected pothole or drop off.

Method Embodiment 8. The method of Method Embodiment 6, wherein the determined environmental condition is the presence of a human being in the environment in which the device being controlled is operating; and wherein determining the first device operating parameter includes using a lower value (e.g., lower maximum speed) for the first device operating parameter due to the detected human presence than would be used in the absence of the detected human presence.

Method Embodiment 9. The method of Method Embodiment 1, further comprising: communicating (522) positional uncertainty corresponding to the determined communications latency to the operator workstation.

Method Embodiment 10. The method of Method Embodiment 9, wherein communicating (522) positional uncertainty corresponding to the determined communications latency includes adding a visual indicator of positional uncertainty to an image of a portion of the operational environment communicated to the operation workstation.

Method Embodiment 11. The method of Method Embodiment 10, wherein the positional uncertainty is indicated by blurring or shading a portion of said image of the portion of the operational environment.

Method Embodiment 12. The method of Method Embodiment 10, wherein the size of the visual indicator (e.g., the size of the blurred image region used to indicate positional uncertainty) is a function of the determined communications latency (e.g., a larger image portion is blurred or shaded the larger the determined communications latency).

Numbered List of Exemplary Apparatus Embodiments

Apparatus Embodiment 1. A robotic device (300), comprising:
a communications interface (311) including i) a transmitter (318 or 319) and ii) a receiver (316 or 317); and
a processor (306) configured to control the robotic device to:
determine a communications latency between the robotic device (300) to be controlled and an operator workstation (122);
determine one or more device operating parameters based at least the determined communications latency;
receive a control signal from the operator workstation; and
implement a device operation based on the received control signal and a device operating parameter determined based on the determined communications latency.

Apparatus Embodiment 2. The robotic device (300) of Apparatus Embodiment 1, wherein the determined operating parameters include a first operating parameter which is one of a maximum device speed or a maximum acceleration.

Apparatus Embodiment 3. The robotic device (300) of Apparatus Embodiment 1, wherein the processor (306) is further configured to: determining a device operation to be performed; and wherein determining (516) one or more device operating parameters based at least the determined communications latency includes determining the first device operating parameter based on both the determined communications latency and the device operation to be preformed.

Apparatus Embodiment 4. The robotic device (300) of Apparatus Embodiment 3, wherein the determined first operating parameter is a maximum device speed, said determined maximum device speed being lower the greater the determined communications latency is.

Apparatus Embodiment 5. The robotic device (300) of Apparatus Embodiment 4, wherein as part of being configured to determine the maximum device speed, the processor (306) is configured to: scale a maximum permitted device speed permitted to be used when the latency is below a latency threshold by the determined amount of communications latency (e.g., the maximum permitted device speed is multiplied by a scaling factor which is a fraction corresponding to a value smaller than one).

Apparatus Embodiment 6. The robotic device (300) of Apparatus Embodiment 3, wherein the processor (306) is further configured to: determine one or more environmental conditions; and wherein determining one or more device operating parameters based at least the determined communications latency includes determining the first device operating parameter based on the determined communications latency, the device operation to be preformed and a detected environmental condition.

Apparatus Embodiment 7. The robotic device (300) of Apparatus Embodiment 6, wherein the determined environmental condition being a pothole or drop off in the environment in which the device being controlled is operating; and wherein, as part of determining the first device operating parameter, the processor uses a lower value (e.g., lower maximum speed) for the first device operating parameter due to the detected pothole or drop off than would be used in the absence of a detected pothole or drop off.

Apparatus Embodiment 8. The robotic device (300) of Apparatus Embodiment 6, wherein the determined environmental condition is the presence of a human being in the environment in which the device being controlled is operating; and
wherein, as part of being configured to determine the first device operating parameter, the processor is configured to: use a lower value (e.g., lower maximum speed) for the first device operating parameter due to the detected human presence than would be used in the absence of the detected human presence.

Apparatus Embodiment 9. The robotic device (300) of Apparatus Embodiment 1, wherein the processor (306) is further configured to control the robotic device to: communicate positional uncertainty corresponding to the determined communications latency to the operator workstation.

Apparatus Embodiment 10. The robotic device (300) of Apparatus Embodiment 9, wherein the processor (306) is configured to control the robotic device to: add a visual indicator (802) of positional uncertainty to an image of a portion of the operational environment communicated to the operation workstation as part of communicating positional uncertainty.

Apparatus Embodiment 11. The robotic device (300) of Apparatus Embodiment 10, wherein the positional uncertainty is indicated by blurring or shading a portion (802) of said image of the portion of the operational environment.

Apparatus Embodiment 12. The robotic device (300) of Apparatus Embodiment 10, wherein the size of the visual indicator (e.g., the size of the blurred image region used to indicate positional uncertainty) is a function of the determined communications latency (e.g., a larger image portion is blurred or shaded the larger the determined communications latency).

Apparatus Embodiment 13. The robotic device of Apparatus Embodiment 1, wherein the robotic device is a robotic forklift.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, implemented using a variety of wireless communications technologies such as CDMA, orthogonal frequency division multiplexing (OFDM), WiFi, and/or various other types of communications techniques which may be used to provide wireless communications links.

Some aspects and/or features are directed a non-transitory computer readable medium embodying a set of software instructions, e.g., computer executable instructions, for controlling a computer or other device, e.g., a vehicle such as a forklift or other robotic device or an operator workstation, to operate in accordance with the above discussed methods.

The techniques of various embodiments may be implemented using software, hardware and/or a combination of software and hardware. Various embodiments are directed to a control apparatus, e.g., controller or control system, which can be implemented using a microprocessor including a CPU, memory and one or more stored instructions for controlling a device or apparatus to implement one or more of the above described steps. Various embodiments are also directed to methods, e.g., a method of controlling a device, e.g., a forklift or other robotic device, or an operator workstation and/or performing one or more of the other operations described in the present application. Various embodiments are also directed to a non-transitory machine, e.g., computer, readable medium, e.g., ROM, RAM, CDs, hard discs, etc., which include machine readable instructions for controlling a machine to implement one or more steps of a method.

As discussed above various features of the present invention are implemented using modules and/or components. Such modules and/or components may, and in some embodiments are, implemented as software modules and/or software components. In other embodiments the modules and/or components are implemented in hardware. In still other embodiments the modules and/or components are implemented using a combination of software and hardware. In some embodiments the modules and/or components are implemented as individual circuits with each module and/or component being implemented as a circuit for performing the function to which the module and/or component corresponds. A wide variety of embodiments are contemplated including some embodiments where different modules and/or components are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

The techniques of the present invention may be implemented using software, hardware and/or a combination of software and hardware. The present invention is directed to apparatus, e.g., a vehicle which implements one or more of the steps of the present invention. The present invention is also directed to machine readable medium, e.g., ROM, RAM, CDs, hard discs, etc., which include machine readable instructions for controlling a machine to implement one or more steps in accordance with the present invention.

Numerous additional variations on the methods and apparatus of the various embodiments described above will be apparent to those skilled in the art in view of the above description. Such variations are to be considered within the scope.

What is claimed is:

1. A control method, comprising: determining, at a device to be controlled, a communications latency between the device to be controlled and an operator workstation, said device being a forklift; determining a device operation to be performed, said device operation to be performed being one of: i) positioning forks of the forklift in a pallet, ii) traveling between locations without a pallet, iii) traveling between locations with a pallet, iv) lifting a pallet or vi) lowering a pallet; determining one or more device operating parameters based at least the determined communications latency, where determining one or more device operating parameters based at least the determined communications latency includes determining a first device operating parameter based on both the determined communications latency and the device operation to be performed; communicating positional uncertainty corresponding to the determined communications latency by adding a visual indicator of positional uncertainty to an image of a portion of an operational environment communicated to the operator workstation, said adding a visual indicator including blurring or shading a portion of said image of the portion of the operational environment, said portion which is blurred or shaded corresponding to the location of the positional uncertainty in the operational environment;

receiving a control signal, used to control motion, from the operator workstation; and implementing a device operation involving motion based on the received control signal and a device operating parameter determined based on the determined communications latency.

2. The method of claim 1, wherein the determined first device parameter is a maximum acceleration.

3. The method of claim 1, wherein determining the first device operating parameter based on both the determined communications latency and the device operation to be performed includes: determining a maximum permitted acceleration for the determined operation to be performed from stored information; comparing the determined communications latency to a latency threshold to determine whether the maximum permitted acceleration is to be modified; and adjusting the determined maximum permitted acceleration when the latency is above the latency threshold but not when the latency is below the latency threshold.

4. The method of claim 3, wherein the method includes storing in memory different maximum permitted accelerations for different device operations to be performed.

5. The method of claim 3, further comprising: determining: i) whether people are present in the environment in which said device is operating or ii) a drop off is present in the environment in which said device is operating; and wherein determining one or more device operating parameters based at least the determined communications latency includes determining the first device operating parameter based on the determined communications latency, the device operation to be performed and whether people or a drop off are present in the environment in which said device is operating.

6. The method of claim 5,
wherein determining: i) whether people are present in the environment in which said device is operating or ii) a drop off is present in the environment in which said device is operating includes determining that a drop off is present in the environment, said drop off being a portion of the environment off of which the device can fall; and
wherein determining the first device operating parameter includes using a lower value for the first device operating parameter due to the detected drop off than would be used in the absence of the drop off.

7. The method of claim 5, wherein determining: i) whether people are present in the environment in which said device is operating or ii) a drop off is present in the environment in which said device is operating includes determining that a human being is present in the environment in which the device being controlled is operating; and wherein determining the first device operating parameter includes using a lower value for the first device operating parameter due to the detected human presence than would be used in the absence of the detected human presence.

8. The method of claim 1, wherein the first device operating parameter is a maximum device speed; and wherein determining the maximum device speed includes scaling a stored maximum permitted device speed permitted to be used when the latency is above a latency threshold, said scaling being based on the determined communications latency.

9. A control method, comprising:
determining, at a device to be controlled, a communications latency between the device to be controlled and an operator workstation, said device being a forklift; determining a device operation to be performed, said device operation to be performed being one of: i) positioning forks of the forklift in a pallet, ii) traveling between locations without a pallet, iii) traveling between locations with a pallet, iv) lifting a pallet or vi) lowering a pallet; determining one or more device operating parameters based at least the determined communications latency, where determining one or more device operating parameters based at least the determined communications latency includes determining a first device operating parameter based on both the determined communications latency and the device operation to be performed; communicating positional uncertainty corresponding to the determined communications latency by adding a visual indicator of positional uncertainty to an image of a portion of an operational environment communicated to the operator workstation, the size of the visual indicator being a function of the determined communications latency; receiving a control signal, used to control motion, from the operator workstation; and implementing a device operation involving motion based on the received control signal and a device operating parameter determined based on the determined communications latency.

10. A robotic device, said robotic device being a forklift, comprising: a communications interface including a transmitter and a receiver; and a processor configured to control the robotic device to: determine a device operation to be performed, said device operation to be performed being one of: i) positioning forks of the forklift in a pallet, ii) traveling between locations without a pallet, iii) traveling between locations with a pallet, iv) lifting a pallet or vi) lowering a pallet;
determine one or more device operating parameters based at least a determined communications latency, where determining one or more device operating parameters based at least the determined communications latency includes determining a first device operating parameter based on both the determined communications latency and the device operation to be performed; communicate positional uncertainty corresponding to the determined communications latency by adding a visual indicator of positional uncertainty to an image of a portion of an operational environment communicated to an operator workstation, said adding a visual indicator including blurring or shading a portion of said image of the portion of the operational environment, said portion which is blurred or shaded corresponding to the location of the positional uncertainty in the operational environment; receive a control signal, used to control motion, from the operator workstation; and implement a device operation involving motion based on the received control signal and a device operating parameter determined based on the determined communications latency.

11. The robotic device of claim 10, wherein the first operating parameter is a maximum acceleration.

12. The robotic device of claim 10, wherein the processor is further configured, as part of being configured to determine one or more device operating parameters, to:
determine a maximum permitted acceleration for the determined operation to be performed from stored information; compare the determined communications latency to a latency threshold to determine whether the maximum permitted acceleration is to be modified; and adjust the determined maximum permitted acceleration when the latency is above the latency threshold but not when the latency is below the latency threshold.

13. The robotic device of claim 12, further comprising memory storing different maximum permitted accelerations for different device operations to be performed.

14. The robotic device of claim 10,
wherein the first operating parameter is a maximum speed;
wherein as part of being configured to determine the first operating parameter, the processor is configured to:
scale a maximum permitted device speed permitted to be used when the latency is above a latency threshold, said scaling being based on the determined communications latency.

15. The robotic device of claim 10, wherein the processor is further configured to: determine one or more environmental conditions; and wherein determining one or more device operating parameters based at least the determined communications latency includes determining the first device operating parameter based on the determined communications latency, the device operation to be performed and a detected environmental condition.

16. The robotic device of claim 15, wherein the determined environmental condition being a pothole or drop off in the environment in which the device being controlled is operating;

and wherein, as part of determining the first device operating parameter, the processor uses a lower value for the first device operating parameter due to the detected pothole or drop off than would be used in the absence of a detected pothole or drop off.

17. A robotic device, said robotic device being a forklift, comprising: a communications interface including a transmitter and a receiver; and a processor configured to control the robotic device to: determine a device operation to be performed, said device operation to be preformed being one of: i) positioning forks of the forklift in a pallet, ii) traveling between locations without a pallet, iii) traveling between locations with a pallet, iv) lifting a pallet or vi) lowering a pallet;

determine one or more device operating parameters based at least a determined communications latency, where determining one or more device operating parameters based at least the determined communications latency includes determining a first device operating parameter based on both the determined communications latency and the device operation to be performed; communicate positional uncertainty corresponding to the determined communications latency by adding a visual indicator of positional uncertainty to an image of a portion of an operational environment communicated to an operator workstation, the size of the visual indicator being a function of the determined communications latency; receive a control signal, used to control motion, from the operator workstation; and implement a device operation involving motion based on the received control signal and a device operating parameter determined based on the determined communications latency.

* * * * *